United States Patent [19]

Burk et al.

[11] 3,829,840

[45] Aug. 13, 1974

[54] VIRTUAL MEMORY SYSTEM

[75] Inventors: John L. Burk; Spurgeon G. Hogan, Jr., both of Poughkeepsie; Russell H. Larson, Wappingers Falls; Bruce L. McGilvray, Pleasant Valley, all of N.Y.

[73] Assignee: International Business Machines Corporation, Armonk, N.Y.

[22] Filed: July 24, 1972

[21] Appl. No.: 274,771

[52] U.S. Cl. .......... 340/172.5
[51] Int. Cl. .......... G06f 3/00
[58] Field of Search .......... 340/172.5

[56] References Cited

UNITED STATES PATENTS

| | | | |
|---|---|---|---|
| 3,569,938 | 3/1971 | Eden et al. | 340/172.5 |
| 3,614,746 | 10/1971 | Klinkhamer | 340/172.5 |
| 3,675,215 | 7/1972 | Arnold et al. | 340/172.5 |
| 3,693,165 | 9/1972 | Reiley et al. | 340/172.5 |
| 3,701,107 | 10/1972 | Williams | 340/172.5 |

*Primary Examiner*—Harvey E. Springborn
*Attorney, Agent, or Firm*—James E. Murray

[57] ABSTRACT

This specification describes a virtual memory system comprising a main storage and a smaller high speed buffer. Both main storage and the buffer are real-address oriented. Current virtual-to-real address translations are retained in a Translation Look Aside Table (TLAT) and real addresses of data stored in the buffer are maintained in a buffer directory. The CPU-provided virtual address causes access to the TLAT and to the buffer directory. The virtual address stored in the word accessed from the TLAT is compared to the virtual address from the CPU and the real addresses accessed from the TLAT and the buffer directory are compared to each other. If both comparisons are equal, the data is accessed from the buffer.

2 Claims, 7 Drawing Figures

VIRTUAL MEMORY SYSTEM

INTRODUCTION

BACKGROUND OF THE INVENTION

This invention relates to computer storage systems and more particularly to computer storage systems including a main storage, a high-speed buffer storage and a dynamic address translation unit to convert a virtual address to a real physical address for storing or fetching data when requested by one of a group of requesting sources.

The following patents and application describe many details of such storage systems and various environments wherein they may be used. Such details which are not essential to a complete understanding of this invention will not be described herein. For fuller descriptions thereof, the following patents and application are to be regarded as being incorporated into this specification by these references: U.S. Pat. No. 3,217,298, issued on 11/9/65 to Kilburn et al. for ELECTRONIC DIGITAL COMPUTING MACHINES; U.S. Pat. No. 3,218,611, issued on 11/16/65 to Kilburn et al. for DATA TRANSFER CONTROL DEVICE; U.S. Pat. No. 3,248,702, issued on 4/26/66 to Kilburn et al. for ELECTRONIC DIGITAL COMPUTING MACHINES; U.S. Pat. No. 3,317,898, issued on 5/2/67 to Hellerman for MEMORY SYSTEM; U.S. Pat. No. 3,533,075, issued on 10/6/70 to Johnson et al. for DYNAMIC ADDRESS TRANSLATION UNIT WITH LOOK-AHEAD; U.S. Patent application Ser. No. 157,912, filed on 6/29/71 by G. E. Schmidt et al. for DYNAMIC ADDRESS TRANSLATION REVERSED.

Various techniques are known whereby several computer programs, executed either by a single central processing unit or by a plurality of processing units, share one memory. Time sharing of such programs requires an extremely large storage capacity, a capacity which is often larger than that of the actual main storage. To accommodate this situation the concept of "virtual storage" is employed. If, for example, a system employs a 24 bit addressing scheme $2^{24}$ approximately 16 million addressable bytes of virtual storage are available. This virtual storage is divided into segments each of which is divided into pages, with each page consisting of a predetermined number of bytes.

The segment and page addresses assigned to virtual storage are arbitrary designations and are not actual locations in main storage. Therefore, virtual segments and pages can be located randomly throughout main storage and swapped in and out of main storage as pages are needed. Random location of segments and pages in main storage necessitates the translation of virtual address into actual address using page and segment tables. A single page table reflects the real locations of all the pages of a particular segment. Other page tables reflect the real locations of the pages associated with the other segments of the virtual storage. Random locations of the page tables necessitate the construction of a segment table that reflects the actual or real location of the page tables. The segment table and page tables for a user are maintained in main storage and are utilized in translating a user's virtual address into a real address (an actual location in main storage) or the required page. The byte portion of a virtual address refers to a real location in memory so that once the segment and page portions of the virtual address have been translated the byte portion is concatenated onto these translated portions to give the real address in main storage. To avoid having to translate an address each time the memory is accessed, current translations of virtual addresses to real addresses are retained in another table called the Translation Look Aside Table (TLAT) where such addresses can be obtained without going through the translation process.

With the advent of buffered storage systems, a high speed buffer is provided in addition to the main storage. The purpose of the high speed buffer is to speed up servicing of requests for data. When the addressed block is in the buffer, a request to fetch information can be filled quickly. The overall effect of the buffer and the way it is used, make main storage appear to have a faster cycle time.

In using the buffer, all requests from the processing unit are checked in a buffer directory to see if the addressed location is in the buffer. If the directory indicates the buffer contains the addressed location and the request is a fetch request, the buffer is cycled and the requested data is sent to the processing unit; if the request is a store request, the data is stored in both the buffer and in main storage. If the buffer directory indicates the buffer does not contain the addressed location, then the request is passed on to main storage for a full main storage cycle. In the case of a fetch request, the data accessed from main storage is passed back to the processing unit and is generally also stored in the buffer for future requests; in the case of a store request, the data is generally stored in main storage. In channel operations, a fetch request for main storage does not involve the buffer; main storage is addressed and the data is sent to the requesting channel. However, in the case of store (write) requests, the buffer is checked to see if the address location is in the buffer and if it is, the channel data is in the buffer.

One form of buffer that may be used for such a system consists of an address array and a corresponding data array. The data array may be arranged to contain blocks of 32 bytes, or four double words, while the address array isarranged to contain block addresses in a one-for-one correspondence to the data blocks in the data array. In a nonvirtual storage system, theblock address portion of the address from the processing unit or the channel may be used to compare with the block addresses in the address array of the buffer to determine whether the addressed location is contained in the buffer. However, in a virtual storage system, where the processing unit provides virtual addresses and the channel provides real addresses, a problem arises in determining whether the real address corresponding to the virtual address provided by the processing unit is contained in the buffer.

A typical prior art solution to this problem is to have a virtual-address oriented buffer wherein the location of data within the buffer is directly related to the virtual address of the data. The primary reason for this approach is that it has been felt that imposing translation (from virtual address to real address) between the central processing unit and the buffer memory could result in an additional access cycle for every CPU request. This scheme would cause a delay when a backing transaction (reference to main storage, or "backing storage") was involved and, therefore, should not affect overall system performance as much as would a delay in the more frequent buffer accesses. However, a number of problems arise when address translation (relocation) is performed in this manner. When two different virtual addresses refer to the same real address, the buffer, being virtual oriented, will place the data from real memory into a different position for each different virtual address. A cross check mechanism is, therefore, required. Another problem is involved with deleting entries from page and segment tables. Data in the buffer which is associated with such deleted entries must retain a path to the backing storage (that is, its real storage location must be maintained). Thus, a scan of the virtual oriented buffer is required on such deletes. Still another problem involves the use of storage protection keys. The keys are normally real-address-oriented and must be examined every CPU reference. Since the CPU reference provides a virtual address, the keys will require special handling.

SUMMARY OF THE INVENTION

In accordance with the invention, the logical problems referred to above are overcome by providing a system wherein the high speed buffer is real-address oriented. The byte portion of the virtual address which refers to a real location in memory is then used to access the buffer directory containing real main memory addresses while simultaneously the page and section portion of the virtual address is used to access the TLAT containing the current translations of virtual addresses to real addresses. If the TLAT contains a real address which corresponds to the CPU's virtual address and this real address is identical to the real address which has been read from the buffer directory, this real address will be used to access data from the high speed buffer. If the real address read from TLAT does not match the real address contained in the buffer directory, this will signify that the data is contained in main storage and a main storage access will be required. Since the real address in main storage of the data has already been provided, no additional address translation will be necessary. (In this case, the decision as to whether or not to place the data into the high speed buffer will be made in accordance with known techniques. If the data is to be placed in the high speed buffer, known techniques will also be used to perform this operation and to update the buffer directory.) If the TLAT does not contain a real address which corresponds to the virtual address supplied by the CPU, known techniques will be used to perform the virtual-to-real address translation, put the translation into the TLAT, access the data, and place the data into the high speed buffer if desired. The primary advantages of this invention are that it avoids thethree logical problems inherent in the prior art approach described above, and that, if a backing transaction is required, the real address will already be available with no necessity for further translation.

The foregoing and other objects, features and advantages of the present invention will be apparent from the following description of a preferred embodiment of the invention as illustrated in the accompanying drawings.

DETAILED DESCRIPTION

Figure 1:
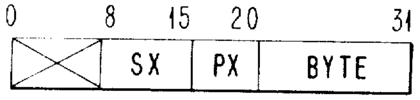
FIG. 1 shows a preferred format for a virtual address.

Since the invention resides primarily in the novel structural combination and themethod of operation of well-known computer circuits and devices, and not in the specific detailed structure thereof, the structure, control, and arrangement of these well-known circuits and devices are illustrated in the drawings by use of readily understandable block representations and schematic diagrams, which show only the specific details pertinent to the present invention. This is done in order not to obscure the disclosure with structural details which will be readily apparent to those skilled in the art in view of the description herein. Also, various portions of these systems have been appropriately consolidated and simplified to stress those portions pertinent to the present invention.

VIRTUAL ADDRESS

Referring to FIG. 1, a preferred format for a virtual address is shown. The 24 bit virtual address is divided into three fields: a segment field (SX) which occupies bits 8–15; a page field (PX) which occupies bits 16–20; and a byte field which occupies bits 21–31. With this format, the virtual storage consists of 256 segments, with each segment consisting of up to 32 pages, and each page consisting of up to 2,048 bytes. Those skilled in the art will, of course, recognize that these field definitions are somewhat arbitrary in nature. For example, one could define the virtual address fields so that SX occupied bits 8–11, PX occupied bits 12–19, and BYTE occupied bits 20–31. With such a format, the virtual storage would consist of 16 segments with each segment consisting of up to 256 pages, and each page consisting of up to 4096 bytes. Bits 0–7 are not used in this preferred embodiment, but could optionally be used to extend the virtual address to provide a 32 bit addressing system. Such a system would have over 4 billion bytes of virtual memory. The segment field serves as an index to an entry in the segment table. The segment table entry contains a value which represents the base address of the page table associated with the segment designated by the segment field. The page field serves as an index to an entry in the page table. The page table entry contains a value which represents the actual or real address of the page. The byte field undergoes no change during translation, and is concatenated with the translated page address to form the actual or real main storage address.

ADDRESS TRANSLATION

Figures 2, 6:
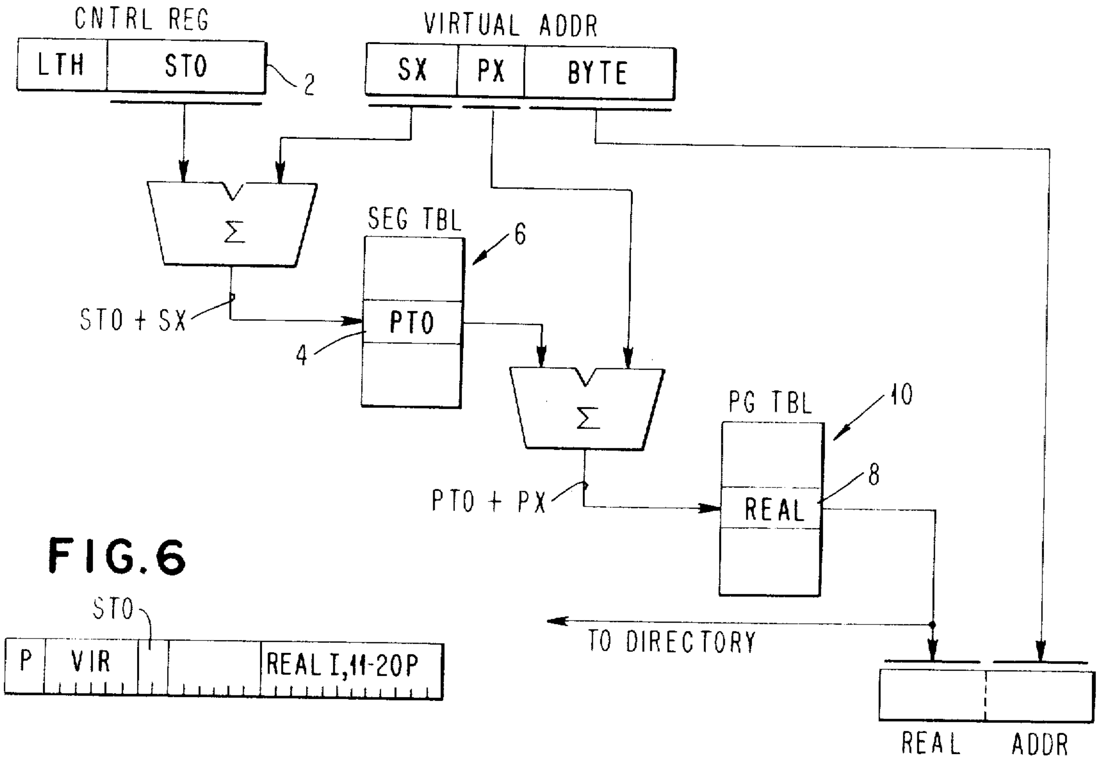
FIG. 2 is a diagrammatic representation of virtual-to-real address translation.
FIG. 6 is a preferred format for entries in a Translation Look Aside Table which forms one part of this invention.

The translation process will be further clarified by reference to FIG. 2. The translation process is a two-level table look-up procedure involving segment and page tables from main storage. The segment address portion (SX) of the virtual address is added to a Segment Table Origin (STO) address stored in a control register 2 in order to obtain a segment table entry 4 from the segment table 6. (Control register 2 will also generally contain the length [LTH] of the segment table.) This segment table entry will contain a Page Table Origin (PTO) address which is added to the page address portion (PX) of the virtual address to provide the address of a page table entry 8 within the page table 10. Page table entry 8 will contain a real address which is cancatenated with the byte portion of the virtual address to form the real address of a byte of data. To avoid repeating this translation process for every storage reference, a directory is provided for storing the SX and PX portions of the virtual address along with the corresponding real address which was read from the page table. The directory will be continually updated to contain virtual and real page addresses of recently referenced pages. Consequently, at the beginning of a translation, the virtual page address under translation will be checked against the directory to see if the real address is already available. If it is, the directory will provide the real page address which will be concatenated with the byte portion of the virtual address to form the real main storage address. If the address under translation is not found in the directory, it will undergo translation as described above and will be placed in the directory along with its real address.

Figure 3:
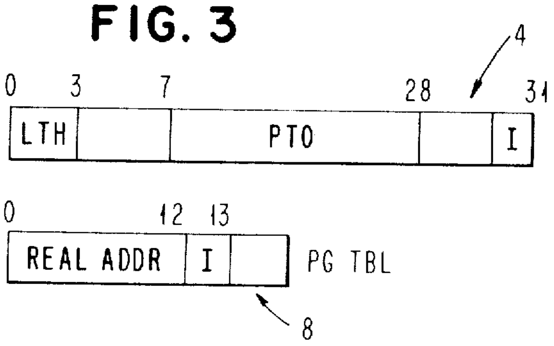
FIG. 3 shows perferred formats for segment table entries and page table entries.

FIG. 3 shows a preferred embodiment for segment table entries 4 and page table entries 8. For each virtual address space, there is a segment table, with corresponding page table. The origin and length of the active segment table is contained in the control register (FIG. 2). The segment table entry 4 contains a length (LTH) field in bits 0–3 which designates the length of the page table in increments that are equal to a 16th of the maximum size. Bit 31, the I bit, indicates the validity of the information contained in the segment table entry. When the I bit is on, the entry cannot be used to perform translations. The page table entry 8 contains, in bit positions 0–12, the high order 13 bits of the real storage address. (The low order real bits of the virtual address are concatenated to the high order bits from the page table to provide the byte displacement within the page.) There is also an I (invalidity) bit associated with each page table entry. When the I bit is on, the entry cannot be used to perform translations.

TRANSLATION PROCESS UTILIZING THE TRANSLATION LOOK ASIDE TABLE

The preceding descriptions have dealt, almost entirely, with aspects of virtual memory systems and address translation (often called "relocation") that are already well-known to those skilled in the art. The following descriptions are more directly related to the new and improved method and apparatus for relocation which is provided by the invention claimed hereinafter.

Figure 4:
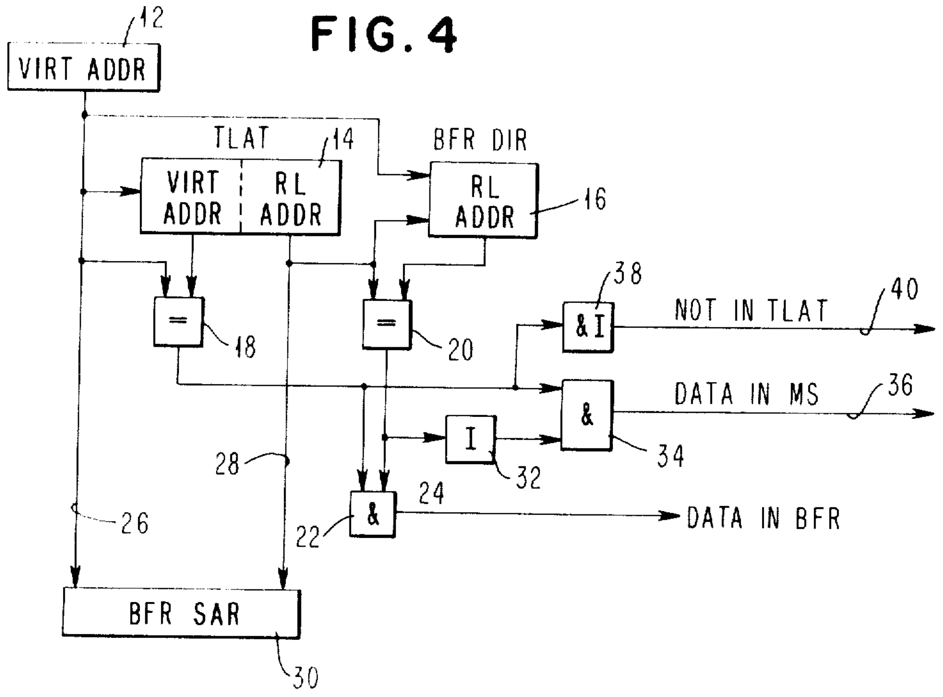
FIG. 4 is a block schematic diagram illustrating elements of a preferred embodiment of this invention.

Various elements of this invention are shown in broad schematic form in FIG. 4. The virtual address 12 provided by the CPU simultaneously interrogates a Translation Look Aside Table (TLAT) 14 and a buffer directory 16. TLAT 14 contains recently translated virtual addresses along with their corresponding real addresses, while buffer directory 16 contains the real addresses of data that have been mapped into the high speed buffer. The tables contained in the TLAT and in the buffer directory may be arranged and accessed in any of several known manners. For example, each could be an associative storage array, or an addressable storage array that is addressed by bits contained in the virtual address where the TLAT is addressed by bits coming from the virtual portion of the address and the directory is accessed by bits coming from the real portion of the address. Since it will most generally be preferable to use only a portion of the virtual address to access the TLAT 14, the portion of the virtual address that was not used for the access will be read from the virtual address portion of the TLAT and compared to the corresponding portion of the CPU-provided virtual address 12 by a comparator 18. In order to ensure that the data mapped into the high speed buffer is the data requested by the virtual address 12, the real address read from the TLAT 14 is compared to the real address read from the buffer directory 16 by comparator 20. The outputs of comparators 18 and 20 are fed to an AND circuit 22, which will generate an output signal on line 24 if the requested data is in the high speed buffer. Appropriate portions of the virtual address and the real address will be fed via lines 26 and 28 to the buffer storage address register 30 so that the data may be addressed from the buffer. If a real address which corresponds to the virtual address 12 is contained in the TLAT 14, but the data is not in the high speed buffer, the output of comparator 20, after inversion by inverter 32, combined with the output of comparator 18 will cause AND circuit 34 to generate a signal on line 36 indicating that a main storage reference is required. If the virtual address 12 does not match a virtual address contained in the TLAT 14, the output of comparator 18 will cause AND-I invert circuit 38 to generate a signal on line 40 which will indicate to the system that the translation process described above with respect to FIG. 2 must be initiated. Specific implementations of the manner in which the contents of buffer storage address register 30 and the signal on line 24 may be used to initiate a buffer access cycle, as well as the manner in which the signals on lines 36 and 40 may be used to initiate appropriate system responses, are well known to those skilled in the art and need not be described herein.

Figure 5:
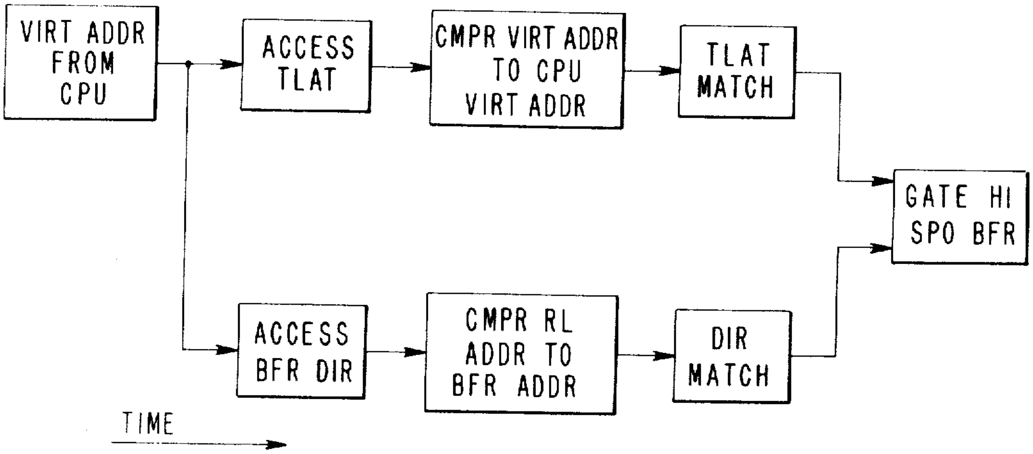
FIG. 5 is a generalized timing diagram showing the sequence of functions performed by the apparatus of FIG. 4.

FIG. 5 presents a brief summary of the functions performed by the apparatus of FIG. 4, and shows which of the functions are performed sequentially and which are performed in parallel. The virtual address from the CPU is used to access, in parallel, the TLAT and the buffer directory. Then, in parallel, the virtual address contained in the TLAT is compared to the virtual address from the CPU and the real address obtained from the TLAT is compared to the real address obtained from the buffer directory. If both of these equalities are present, there will be a TLAT match and a directory match, and the concurrent matches will be used to outgate (for reading) or ingate (for writing) the high speed buffer.

In the preferred embodiment of this invention, the Translation Look Aside Table contains 64 words, each of which contains two virtual address entries along with their respective real address entries. Each word contains entries for an even numbered page and entries for the next odd numbered page. When the TLAT is accessed for translation, the appropriate half of the work will be gated out by the low order bit (bit 20) of the page address portion PX of the virtual address. Some of the details of the format of the TLAT words are shown in FIG. 6. Since both halves of the word are identical in format, only one half, consisting of 27 bits, is shown. It will be remembered (from FIG. 1) that the segment address portion SX and the page address portion PX of the virtual address together contain 13 bits. In the preferred embodiment of this invention, six of those bits will be used to address the TLAT and, as was mentioned above, a seventh bit will be used to select an appropriate half of the TLAT word. Thus, only six bits of the virtual address, designated VIR in FIG. 6, need be stored in the TLAT entry. A 12 bit portion of the word contains the 10 real address bits that form the translation of the SX and PX portions of the virtual address, as well as an I bit and a P (parity) bit. Six bits, labeled ST PRO, may be reserved for storage protection functions (not herein described). Two encoded validity bits, labeled STO, are also associated with each TLAT entry in the preferred embodiment. These bits are used to indicate when an entry is valid or invalid. When an entry is valid, it can refer to one of three different address spaces, depending on the value of the encoded STO bits. The STO (Segment Table Origin) values corresponding to the encoded bits are kept in local store, and their assignment is controlled by the microprogram contained within a microprogrammed control store. The four configurations of these STO bits are given the following meanings: 00 represents an invalid entry; 01 represents a valid entry associated with the first STO value contained in local store; 10 represents a valid entry associated with the second STO value retained in local store; and 11 represents a valid entry associated with the third STO value retained in local store. Whenever the control register (see FIG. 2) is loaded with a segment table origin address, the microcode determines if it corresponds to one of the three current STO values in local store. If the STO being loaded does not correspond to an existing STO value, then an assignment is made. If all three encoded STO's are active, and none of them compares with the new value, the oldest one is purged from the TLAT (by setting the STO bit which referred to it on 00) and the encoded bits are reassigned to the new value.

The TLAT is addressed using three virtual bits of SX (bits 13, 14 and 15) and three virtual bits of PX (bits 17, 18 and 19) to select one of the 64 locations. The lowest PX bit (bit 20) selects the odd or even entry. The virtual address bits that are mapped into the TLAT are, for this preferred embodiment, bits 8, 9, 10, 11, 12 and 16. To translate a virtual address, the TLAT is interrogated at one of the 64 addresses and the odd or even entry selected. The remaining high order virtual bits in the address provided by the CPU are compared to the high order virtual bits read out of the TLAT. If a match is indicated, the translated address is obtained from the real address field. The real address is then compared against the buffer directory to determine if the address has been mapped into the high speed buffer. If the address is not in the buffer, main storage is referenced. When a translation is not found in the TLAT, the system performs the translation (see FIG. 2) and maps it into the TLAT. At the same time, in the preferred embodiment, the corresponding odd or even page is also translated (if valid) and mapped into the TLAT, thus performing two translations at once.

Figure 7:
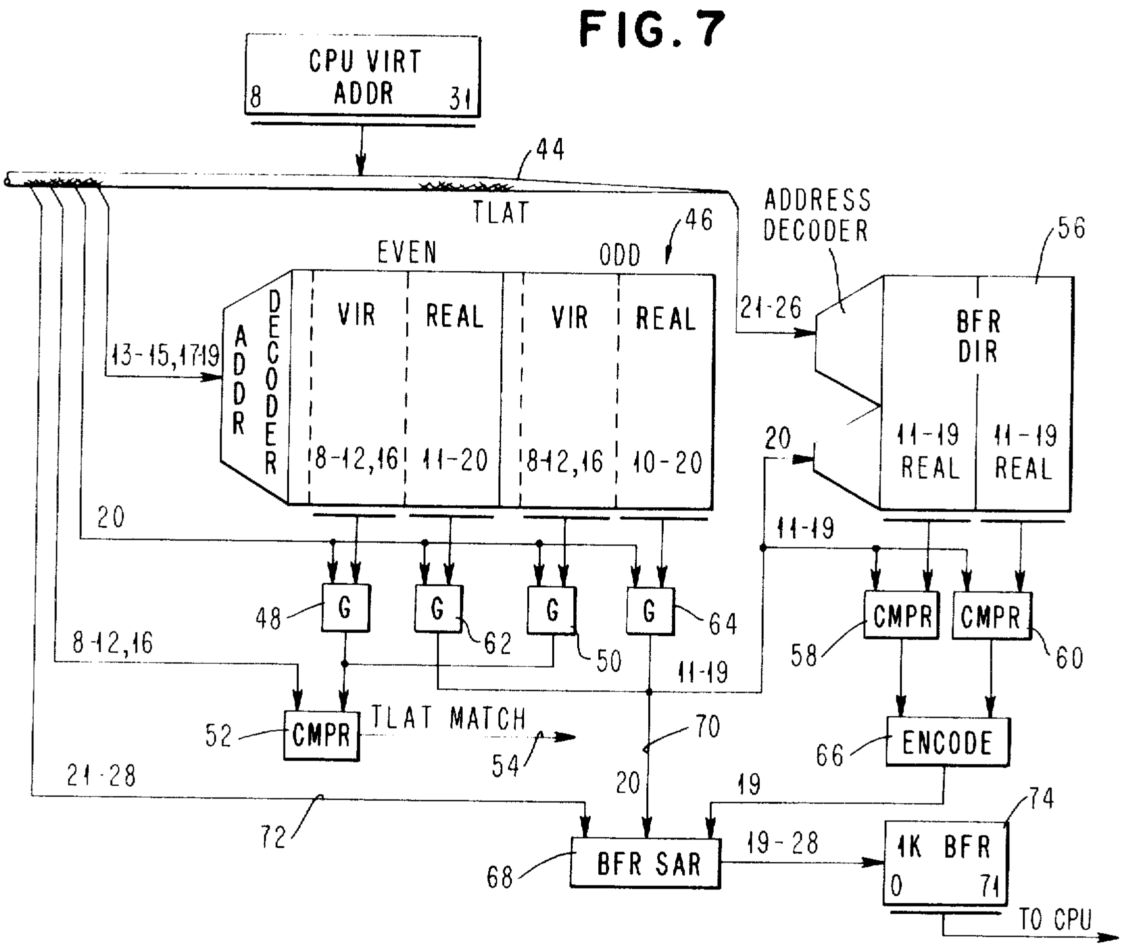
FIG. 7 is a block schematic diagram providing a more detailed illustration of the preferred embodiment of the invention.

Additional details of the preferred embodiment of the invention are shown in FIG. 7. Bits 8–31 of the virtual address supplied by the CPU are supplied to a storage address bus 44 for distribution within the data processing system. Bits 13–15 and 17–19 are used to address the Translation Look Aside Table 46 which contains virtual address bits 8–12 and 16. The portion of the TLAT which contains translations for even virtual addresses furnishes these virtual address bits to gating circuitry 48, while the portion of the TLAT which contains odd virtual addresses furnishes these virtual address bits to gating circuitry 50. If bit 20 of the virtual address is a 0, it will cause gate 48 to pass the six virtual address bits to comparison circuitry 52; if bit 20 is a 1, it will cause gate 50 to pass virtual address bits from the odd portion of the TLAT to comparison circuitry 52. Bits 8–12 and 16 of the virtual address provided by the CPU are also furnished to comparator 52. If comparator 52 receives inputs that are equal to each other, it will generate a signal on line 54 indicating a TLAT match. At the same time that the TLAT is being accessed, the buffer directory will be accessed by bits 21-26 of the address provided by the CPU. These bits of the virtual address correspond to real main memory locations. Therefore, their use in addressing the directory 56 is compatible with the real address orientation of the buffer memory. In the preferred embodiment, the buffer directory contains 128 words, each of which contains two real addresses. Bits 21–26, therefore, access two real addresses. Selection between these two addresses is made by decoding at the output of the directory 56 with the 20th bit of the real address. Determination of the 20th real bit must, of course, await the opening of gate 62 or 64 as described hereinabove. However, once the 20th bit is set, one of the two real addresses contained in the buffer directory is read out into one of two comparison circuits 58 or 60. At substantially the same time, a real address from the appropriate (even or odd) portion of the TLAT 46 will be gated by gate 62 or 64 (depending upon whether bit 20 is a 0 or a 1, respectively) to comparators 58 and 60. If either of the comparators detects equality at its inputs, encoding circuitry 66 will, based upon which of the comparators sensed the equality, generate bit 19 of the real address and transmit it to the buffer storage address register 68. At substantially the same time, bit 20 of the real address will be transmitted via line 70 from the TLAT 46 to address register 68 and bits 21–28 of the real address will be transmitted via line 72 from storage address bus 44 to address register 68. Bits 19–28 contained in buffer storage address register 68 will be used to access one of 1,024 words stored in high speed buffer 74 for transmission to the CPU. Bits 29–31 (the low order real address bits) of the virtual address supplied by the CPU need not be utilized in accessing the high speed buffer because, in the preferred embodiment, each word in the buffer contains eight bytes of data, each byte consisting of eight data bits plus one parity bit. The CPU will utilize the three low order bits (bits 29–31) to select one of the eight bytes read from the high speed buffer. If neither comparator 58 nor 60 had sensed an equality (no buffer directory match - data not in high speed buffer) or if comparator 52 had not sensed an equality (no TLAT match - translation not already available) the situation would be handled in the manner discussed above with respect to FIG. 4.

Although, in describing the preferred embodiment of the invention, various parameters were specified either explicitly or implicitly, those skilled in the art will readily recognize that this invention is not limited to the formats and sizes described above. (An example of an implicitly specified parameter is the size of the main or "backing" store. Since the size of the virtual memory was given as being over 16 million bytes, and 13 bits of the virtual address were shown to be translated into 10 bits of a read address, it is clear that the real address utilized in the preferred embodiment contains somewhat over two million bytes of data.)

It will also be recognized that the terms "virtual memory" and "virtual address" need not be limited to the definitions used herein. Essentially, a virtual address is an address which is changed prior to its utilization to access storage.

Those skilled in the art will further recognize that buffer accesses need not necessarily be delayed until the address comparisons have been completed. Access to the buffer could be initiated, for example, by the virtual address and, depending upon the result of the address comparisons, system usage of data read from the buffer could be inhibited (degated) later in the cycle. In such a system, the buffer would still be real-address oriented in the sense that its buffer directory would still contain real addresses.

The drawing of the invention are in block diagram form. These are well known blocks and any suitable elements may be used in their place. For instance, the TLAT 46, BFR DIR 56, and the 1K BFR 74 are all random access buffers. An example of the interior configuration of a random access buffer can be found beginning on page 76 of the "Digest of Technical Papers of the 1971 IEEE International Solid-State Circuits Conference." Comparators such as blocks 52, 58 and 60 are also well known. An example of a comparator is shown in U.S. Pat. No. 3,289,160 to Carter.

While the invention has been particularly shown and described with reference to a preferred embodiment thereof, it will be understood by those skilled in the art that the above and other changes in form and details may be made therein without departing from the spirit and scope of the invention.

What is claimed is:

1. In a data processing system which contains a central processing unit, a main storage having n addressable locations each addressable by a real storage address, a buffer storage having fewer than n addressable locations each addressable by a real storage address, addressing means providing virtual addresses each having a virtual portion which is made up of bits that do not constitute a portion of real storage address and a real displacement which is made up of address bits that constitute a portion of real storage address, and translation table means for translating virtual portions of the virtual addresses to real address portions other than said real displacement, an improved translation storage means responsive to said virtual addresses comprising:

first table means storing a portion of each of the addresses in a first plurality of real addresses of data contained in main storage, said portion having been translated from a corresponding virtual address using the translation table means;

second table means storing a portion of each address in a plurality of read addresses of data stored in the buffer storage;

means responsive to a virtual portion received by said translation storage means to cause a real address translated from said virtual address to be read from said first table means;

means responsive to only the real displacement received by said translation storage means to cause a plurality of real addresses translated from said virtual address to be selected in parallel from said second table means;

decode means responsive to a portion of the real address read out of said first table means to select one of the plurality of real addresses for reading out of the second table means;

comparing means for comparing said address read from said first table means to said address from said second table means; and means responsive to an equal compare from said comparing means to provide an indication that the addressed data is in said buffer storage.

2. The storage control means of claim 1 wherein:

said first table means includes means for storing with each real address at least part of the virtual address from which said each real address is translated.

* * * * *